(12) United States Patent
Chiang et al.

(10) Patent No.: US 11,997,311 B2
(45) Date of Patent: May 28, 2024

(54) METHODS AND APPARATUSES OF COMBINING MULTIPLE PREDICTORS FOR BLOCK PREDICTION IN VIDEO CODING SYSTEMS

(71) Applicant: MEDIATEK INC., Hsinchu (TW)

(72) Inventors: Man-Shu Chiang, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/267,124

(22) PCT Filed: Sep. 17, 2019

(86) PCT No.: PCT/CN2019/106201
§ 371 (c)(1),
(2) Date: Feb. 9, 2021

(87) PCT Pub. No.: WO2020/057504
PCT Pub. Date: Mar. 26, 2020

(65) Prior Publication Data
US 2021/0314602 A1 Oct. 7, 2021

Related U.S. Application Data

(60) Provisional application No. 62/732,019, filed on Sep. 17, 2018.

(51) Int. Cl.
*H04N 19/56* (2014.01)
*H04N 19/176* (2014.01)
*H04N 19/517* (2014.01)

(52) U.S. Cl.
CPC ........... *H04N 19/56* (2014.11); *H04N 19/176* (2014.11); *H04N 19/517* (2014.11)

(58) Field of Classification Search
CPC .. H04N 19/176; H04N 19/105; H04N 19/159; H04N 19/70; H04N 19/52;
(Continued)

(56) References Cited

U.S. PATENT DOCUMENTS 8,774,272 B1 * 7/2014 Chen .................... H04N 19/149
375/240.12
9,432,680 B2   8/2016 Lee
(Continued)

FOREIGN PATENT DOCUMENTS

CN   102860006 A   1/2013
CN   103096071 A   5/2013
(Continued)

OTHER PUBLICATIONS

Man-Shu Chiang et al., CE10.1.1: Multi-hypothesis prediction for improving AMVP mode, skip or merge mode, and intra mode, Joint Video Experts Team (JVET) of ITU-T SG 16 WP 3 and ISO/IEC JTC 1/SC 29/WG 11, Document: JVET-L0100-v3, 12th Meeting, Macao China, Oct. 3-12, 2018. (Year: 2018).*
(Continued)

*Primary Examiner* — Daniel Chang
(74) *Attorney, Agent, or Firm* — McClure, Qualey & Rodack, LLP (57) ABSTRACT

Video processing methods and apparatuses for coding a current block generate a final predictor by combining multiple predictors of the current block. One of the predictors for the current block is a motion compensated predictor, which is generated according to one candidate selected from a first candidate list. The construction of the first candidate list includes deriving an average candidate by averaging motion information of existing candidates in the first candidate list. A second predictor for the current block is another motion compensated predictor or an intra predictor.

14 Claims, 8 Drawing Sheets

(58) Field of Classification Search
CPC .... H04N 19/593; H04N 19/11; H04N 19/157; H04N 19/107; H04N 19/103
See application file for complete search history.

(56) References Cited

U.S. PATENT DOCUMENTS

| | | | |
|---|---|---|---|
| 9,479,793 B2 | 10/2016 | Kim et al. | |
| 10,356,409 B2 | 7/2019 | Oh et al. | |
| 10,567,786 B2 | 2/2020 | Wu et al. | |
| 11,051,010 B2* | 6/2021 | Chiang | H04N 19/52 |
| 11,178,414 B2* | 11/2021 | Chiang | H04N 19/189 |
| 11,553,173 B2* | 1/2023 | Chiang | H04N 19/105 |
| 2009/0279799 A1 | 11/2009 | Suzuki | H04N 19/176 375/240.15 |
| 2011/0142132 A1* | 6/2011 | Tourapis | H04N 19/105 375/E7.243 |
| 2011/0170595 A1* | 7/2011 | Shi | H04N 19/176 375/E7.243 |
| 2012/0320969 A1 | 12/2012 | Zheng et al. | |
| 2013/0077691 A1* | 3/2013 | Zheng | H04N 19/103 375/240.16 |
| 2013/0107958 A1* | 5/2013 | Shimada | H04N 19/198 375/E7.125 |
| 2013/0195189 A1 | 8/2013 | Seregin et al. | |
| 2014/0341284 A1* | 11/2014 | Kim | H04N 19/593 375/240.12 |
| 2015/0271489 A1* | 9/2015 | Sugio | H04N 19/147 375/240.16 |
| 2015/0271516 A1* | 9/2015 | Arimura | H04N 19/149 375/240.16 |
| 2016/0316221 A1* | 10/2016 | Ikai | H04N 19/52 |
| 2017/0064299 A1 | 3/2017 | Rusert et al. | |
| 2017/0150173 A1* | 5/2017 | Takehara | H04N 19/105 |
| 2017/0230666 A1* | 8/2017 | Tourapis | H04N 19/159 |
| 2017/0251213 A1* | 8/2017 | Ye | H04N 19/159 |
| 2018/0048896 A1* | 2/2018 | Park | H04N 19/587 |
| 2018/0131958 A1* | 5/2018 | Sugio | H04N 19/105 |
| 2018/0249156 A1* | 8/2018 | Heo | H04N 19/103 |
| 2018/0270502 A1* | 9/2018 | Mukherjee | H04N 19/11 |
| 2018/0302621 A1* | 10/2018 | Fu | H04N 19/136 |
| 2020/0029073 A1* | 1/2020 | Chiang | H04N 19/52 |
| 2020/0120339 A1* | 4/2020 | Chiang | H04N 19/176 |
| 2020/0154101 A1* | 5/2020 | Li | H04N 19/137 |
| 2020/0162737 A1* | 5/2020 | Van der Auwera | H04N 19/136 |
| 2020/0177873 A1* | 6/2020 | Li | H04N 19/103 |
| 2020/0195948 A1* | 6/2020 | Li | H04N 19/176 |
| 2021/0014505 A1* | 1/2021 | Wang | H04N 19/186 |
| 2021/0051345 A1* | 2/2021 | Tsai | H04N 19/176 |
| 2021/0266602 A1* | 8/2021 | Chernyak | H04N 19/11 |
| 2021/0274166 A1* | 9/2021 | Chiang | H04N 19/46 |
| 2021/0321102 A1* | 10/2021 | Chen | H04N 19/176 |

FOREIGN PATENT DOCUMENTS

| | | | | |
|---|---|---|---|---|
| CN | 103891290 A | 6/2014 | | |
| CN | 104954803 A | 9/2015 | | |
| WO | 2013/002557 A2 | 1/2013 | | |
| WO | 2016/078511 A1 | 5/2016 | | |
| WO | 2017/076221 A1 | 5/2017 | | |
| WO | WO-2017076221 A1 * | 5/2017 | | H04N 19/159 |
| WO | WO-2017105097 A1 * | 6/2017 | | H04N 19/105 |
| WO | 2018/127188 A1 | 7/2018 | | |

OTHER PUBLICATIONS

International Search Report dated Dec. 18, 2019, issued in application No. PCT/CN2019/106201.

Chinese language office action dated Jan. 8, 2021, issued in application No. TW 108133334.

Extended European Search Report dated May 3, 2022, issued in application No. EP 19862307.6.

Hsu, C., et al.; "Description of SDR video coding technology proposal by MediaTek;" Joint Video Experts Team (JVET) of ITU-T SG 16 WP 3 and ISO/IEC JTC 1/SC 29/WG 11; Apr. 2018; pp. 1-64.

Chen, J., et al.; "Algorithm Description of Joint Exploration Test Model 7 (JEM 7);" Joint Video Exploration Team (JVET) of ITU-T SG 16 WP 3 and ISO/IEC JTC 1/SC 29/WG 11; Aug. 2017; pp. 1-50.

Hsiao, Y., et al.; "CE4.2.8: Merge mode enhancement;" Joint Video Experts Team (JVET) of ITU-T SG 16 WP 3 and ISO/IEC JTC 1/SC 29/WG 11; Jul. 2018; pp. 1-6.

Chinese language office action dated Apr. 12, 2023, issued in application No. CN 201980059945.1.

* cited by examiner

| MergeIdx | L0 | L1 |
|---|---|---|
| 0 | mvL0_A, ref0 | |
| 1 | | mvL1_A, ref1 |
| 2 | | |
| 3 | | |
| 4 | | |

32

| MergeIdx | L0 | L1 |
|---|---|---|
| 0 | mvL0_A, ref0 | |
| 1 | | mvL1_A, ref1 |
| 2 | mvL0_A, ref0 | mvL0'_A, ref0' |
| 3 | mvL1'_A, ref1' | mvL1_A, ref1 |

METHODS AND APPARATUSES OF COMBINING MULTIPLE PREDICTORS FOR BLOCK PREDICTION IN VIDEO CODING SYSTEMS

CROSS REFERENCE TO RELATED PATENT APPLICATION(S)

The present invention claims priority to U.S. Provisional Patent Application, Ser. No. 62/732,019, filed on Sep. 17, 2018, entitled "Candidate list generation for multi-hypothesis". The listed U.S. Provisional Patent Application is hereby incorporated by reference in its entirety.

TECHNICAL FIELD

The present invention relates to video processing methods and apparatuses in video encoding and decoding systems. In particular, the present invention relates to generating candidate lists for inter picture prediction.

BACKGROUND

The High-Efficiency Video Coding (HEVC) standard is the latest international video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities. The HEVC standard relies on a block-based coding structure which divides each video slice into multiple square Coding Tree Units (CTUs), where a CTU is the basic unit for video compression in HEVC. In the HEVC main profile, minimum and the maximum sizes of a CTU are specified by syntax elements signaled in the Sequence Parameter Set (SPS). A raster scan order is used to encode or decode CTUs in each slice. Each CTU may contain one Coding Unit (CU) or recursively split into four smaller CUs according to a quad-tree partitioning structure until a predefined minimum CU size is reached. At each depth of the quad-tree partitioning structure, an N×N block is either a single leaf CU or split into four blocks of sizes N/2×N/2, which are coding tree nodes. If a coding tree node is not further split, it is the leaf CU. The leaf CU size is restricted to be larger than or equal to the predefined minimum CU size, which is also specified in the SPS.

The prediction decision is made at the CU level, where each CU is coded using either inter picture prediction or intra picture prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. For intra picture prediction, spatial neighboring reconstructed pixels are used to generate directional prediction. Motion estimation in inter picture prediction identifies one (uni-prediction) or two (bi-prediction) best reference blocks for a current block in one or two reference pictures, and motion compensation in inter picture prediction locates the one or two best reference blocks according to one or two motion vectors (MVs). A difference between the current block and a corresponding predictor is called prediction residual. The corresponding predictor is the best reference block when uni-prediction is used. When bi-prediction is used, the two reference blocks located by the two motion vectors are combined to form a final predictor. The prediction residual belong to a CU is split into one or more Transform Units (TUs) according to another quad-tree block partitioning structure for transforming residual data into transform coefficients for compact data representation. The TU is a basic representative block for applying transform and quantization on the residual data. For each TU, a transform matrix having the same size as the TU is applied to the residual data to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two dimensional sample array of one color component associated with the CTU, CU, PU, and TU respectively. For example, a CTU consists of one luma CTB, two corresponding chroma CTBs, and its associated syntax elements.

Figure 1:
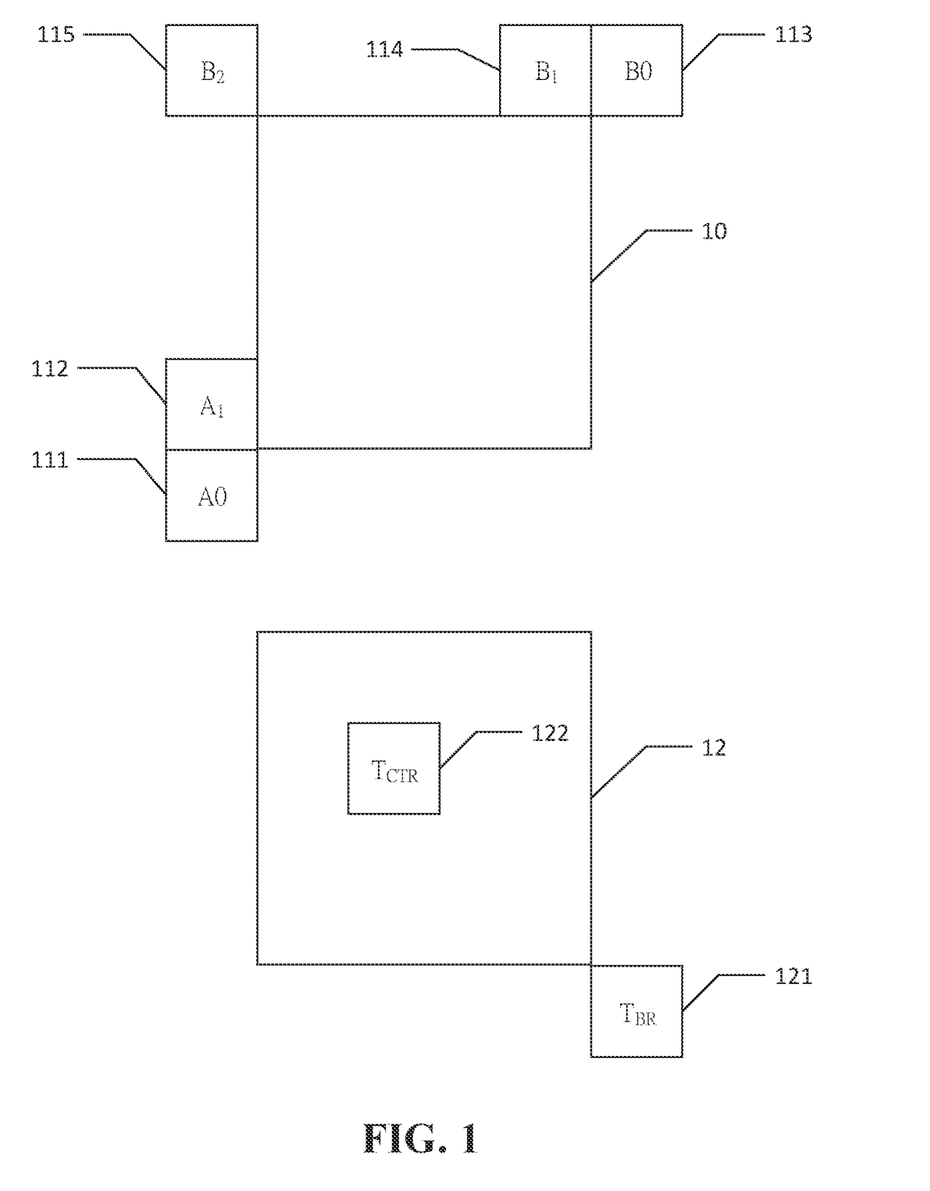
FIG. 1 illustrates locations of spatial candidates and temporal candidates for constructing a candidate list for AMVP mode, Skip mode, or Merge mode defined in the HEVC standard.

Inter Picture Prediction Modes There are three inter picture prediction modes in HEVC, including Advanced Motion Vector Prediction (AMVP), Skip, and Merge modes. Motion vector prediction is used in these inter picture prediction modes to reduce bits required for motion information coding. The motion vector prediction process includes generating a candidate list including multiple spatial and temporal motion candidates and pruning the candidate list to remove redundancy. A Motion Vector Competition (MVC) scheme is applied to select a final motion candidate among the candidate list. To encode PUs using AMVP mode, inter prediction directions, reference picture indices, Motion Vector Differences (MVDs), and prediction residual are transmitted in a video bitstream by the encoder. The inter prediction direction of a PU describes the prediction direction such as list 0 (L0) prediction, list 1 (L1) prediction, or bi-directional prediction. A motion vector of a PU coded in AMVP mode is derived by adding a transmitted MVD with a selected Motion Vector Predictor (MVP) at the decoder. An MVP index is also encoded and transmitted for each prediction direction to select one MVP from an AMVP candidate list. A default AMVP candidate list in HEVC includes two spatial motion candidates and one temporal motion candidate. FIG. 1 illustrates locations of the motion candidates for deriving a candidate list for a PB 10 coded in AMVP mode, Skip mode, or Merge mode. The two spatial motion candidates in the candidate list for AMVP mode include a left candidate and a top candidate. The left candidate for the current PB 10 is searched from below left to left, from block $A_0$ 111 to block $A_1$ 112, and the MV of the first available block is selected as the left candidate, while the top candidate is searched from above right to above left, from block $B_0$ 113, to block $B_1$ 114, and then block $B_2$ 115, and the MV of the first available block is selected as the top candidate. A block having motion information, or in other words, a block coded in inter picture prediction, is defined as an available block. The temporal motion candidate is the MV of a first available block selected from block $T_{BR}$ 121 adjacent to a bottom-right corner of a collocated block 12 and block $T_{CTR}$ 122 inside the collocated block 12 in a reference picture. The reference picture is indicated by signaling a flag and a reference picture index in a slice header to specify which reference picture list and which reference picture in the reference picture list is used.

To increase the coding efficiency of motion information coding in AMVP mode, Skip and Merge modes were proposed and adopted in the HEVC standard to further reduce the data bits required for signaling motion information by inheriting motion information from a spatially neighboring block or a temporal collocated block. For a PU coded in Skip or Merge mode, only an index of a selected final candidate is coded instead of the motion information, as the PU reuses the motion information of the selected final candidate. The motion information reused by the PU includes a motion vector (MV), an inter prediction indicator, and a reference picture index of the selected final candidate. It is noted that if the selected final candidate is a temporal motion candidate, the reference picture index is always set to zero to indicate the first reference picture in list 0 or list 1. Prediction residual are coded when the PU is coded in Merge mode, however, the Skip mode further skips signaling of the prediction residual as the residual data of a PU coded in Skip mode is forced to be zero.

A Merge candidate list consists of up to four spatial motion candidates and one temporal motion candidate. As shown in FIG. 1, the first Merge candidate is motion information of a left block $A_1$ 112, the second Merge candidate is motion information of a top block $B_1$ 114, the third Merge candidate is motion information of a right above block $B_0$ 113, and a fourth Merge candidate is motion information of a left below block $A_0$ 111. Motion information of a left above block $B_2$ 115 is included in the Merge candidate list to replace a candidate of an unavailable spatial block. A fifth Merge candidate is motion information of a temporal block of first available temporal blocks $T_{BR}$ 121 and $T_{CTR}$ 122. The encoder selects one final candidate from the candidate list for each PU coded in Skip or Merge mode based on MVC such as through a rate-distortion optimization (RDO) decision, and an index representing the selected final candidate is signaled to the decoder. The decoder selects the same final candidate from the candidate list according to the index transmitted in the video bitstream.

A pruning process is performed after deriving the candidate list for AMVP, Merge, or Skip mode to check the redundancy among candidates in the candidate list. After removing one or more redundant or unavailable candidates, the size of the candidate list could be dynamically adjusted at both the encoder and decoder sides, and an index for indicating the selected final candidate could be coded using truncated unary binarization to reduce the required data bits. However, although the dynamic size of the candidate list brings coding gain, it also introduces a potential parsing problem. A mismatch of the candidate list derived between the encoder side and the decoder side may occur when a MV of a previous picture is not decoded correctly and this MV is selected as the temporal motion candidate. A parsing error is thus present in the candidate list and it can propagate severely. The parsing error may propagate to the remaining current picture and even to the subsequent inter coded pictures that allow temporal motion candidates. In order to prevent this kind of parsing error propagation, a fixed candidate list size for AMVP mode, Skip mode, or Merge mode is used to decouple the candidate list construction and index parsing at the encoder and decoder sides. In order to compensate the coding loss caused by the fixed candidate list size, additional candidates are assigned to the empty positions in the candidate list after the pruning process. The index for indicating the selected final candidate is coded in truncated unary codes of a maximum length, for example, the maximum length is signaled in a slice header for Skip and Merge modes, and is fixed to 2 for AMVP mode in HEVC. The size of the AMVP candidate list is 2, so only the first two motion candidates are included in the AMVP candidate list after the derivation process of the two spatial and one temporal motion candidates.

For a candidate list constructed for a block coded in AMVP mode, a zero vector motion candidate is added to fill an empty position in the candidate list after derivation and pruning of two spatial motion candidates and one temporal motion candidate according to the current HEVC standard. As for Skip and Merge modes in HEVC, after derivation and pruning of four spatial motion candidates and one temporal motion candidate, three types of additional candidates are derived and added to fill the empty positions in the Merge candidate list if the number of available candidates is less than the fixed candidate list size. The three types of additional candidates used to fill the candidate list include a combined bi-predictive Merge candidate, a scaled bi-predictive Merge candidate, and a zero vector Merge/AMVP candidate.

Figure 2:
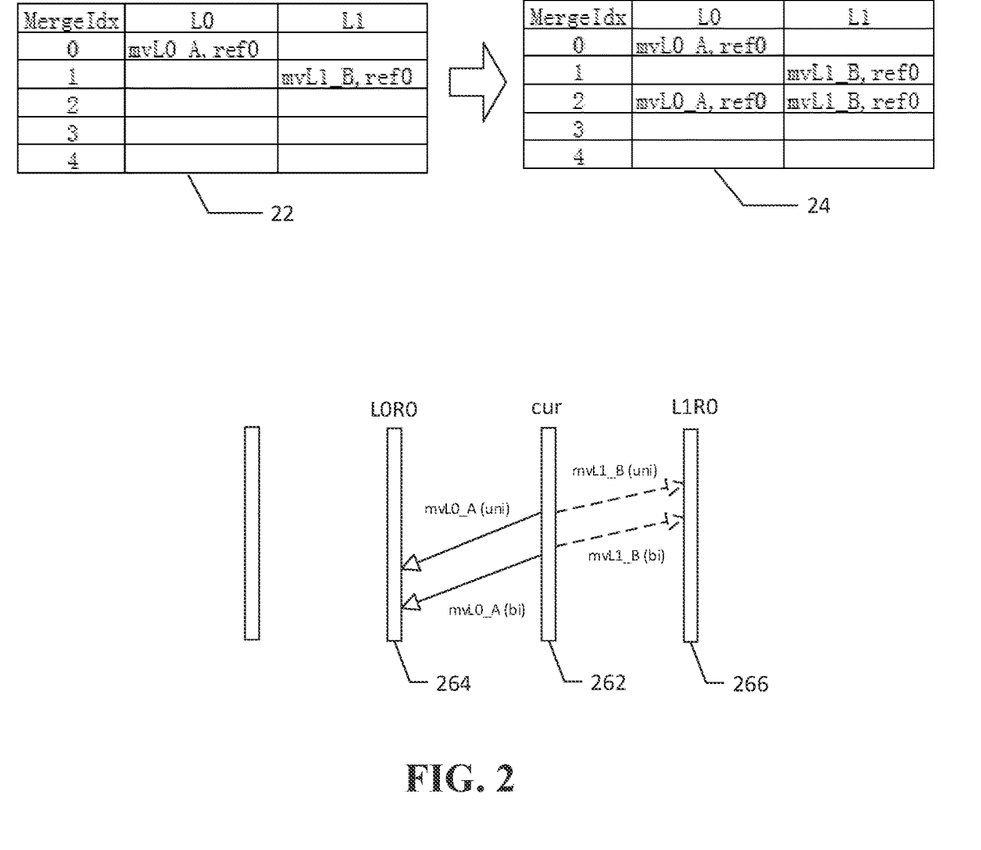
FIG. 2 illustrates an example of deriving a combined bi-predictive Merge candidate from two existing uni-directional motion candidates already existed in a Merge candidate list.

The combined bi-predictive Merge candidate is created by combining two original motion candidates already included in the Merge candidate list according to a predefined order. An example of deriving a combined bi-predictive Merge candidate for a Merge candidate list is illustrated in FIG. 2. The Merge candidate list 22 in FIG. 2 only has two motion candidates mvL0_A with ref0 in list 0 and mvL1_B with ref0 in list 1 after the pruning process, and these two motion candidates are both uni-predictive motion candidates, the first motion candidate mvL0_A predicts the current block in the current picture 262 from a past picture L0R0 264 (reference picture 0 in List 0) and the second motion candidate mvL1_B predicts the current block in the current picture 262 from a future picture L1R0 266 (reference picture 0 in List 1). The combined bi-predictive Merge candidate combines the first and second motion candidates to form a bi-predictive motion vector with a motion vector points to a reference block in each list. The predictor of this combined bi-predictive motion candidate is derived by averaging the two reference blocks pointed by the two motion vectors. The updated candidate list 24 in FIG. 2 includes this combined bi-predictive motion candidate as the third motion candidate (MergeIdx=2).

Figure 3:
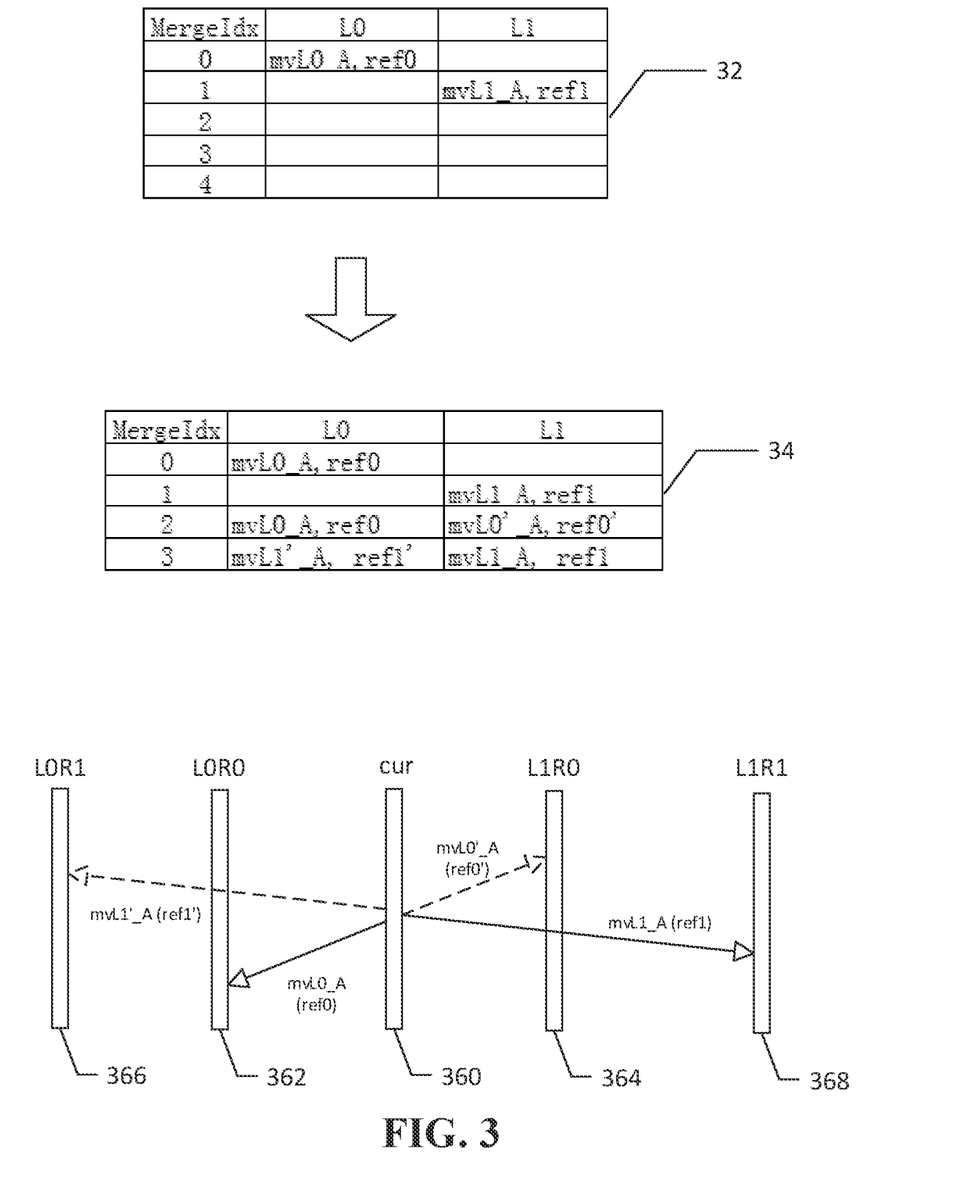
FIG. 3 illustrates an example of deriving two scaled bi-predictive Merge candidates from two existing uni-directional motion candidates already existed in a Merge candidate list.

The scaled bi-predictive Merge candidate is created by scaling an original uni-predictive Merge candidate in another list. For example, one original candidate has a motion vector in list X, mvLX, and a reference picture index in list X, refIdxLX, is used to create a bi-predictive Merge candidate, where X is 0 or 1. An example of deriving a scaled bi-predictive Merge candidate is shown in FIG. 3, where an original Merge candidate list 32 only has two motion candidates. A first motion candidate (MergeIdx=0) of a current block in a current picture 360 is a list 0 uni-predictive motion candidate with a motion vector mvL0_A and a reference picture index ref0 pointing to a reference block in a reference picture L0R0 362. To construct a scaled bi-predictive Merge candidate, the reference picture ref0 is first copied to a reference picture index ref0' in list 1, and a scaled motion vector mvL0'_A is calculated by scaling the motion vector mvL0_A with the reference pictures ref0 and ref0'. The scaled motion vector mvL0'_A and the reference picture index ref0' points to a reference block in a reference picture L1R0 364. A bi-predictive Merge candidate, which has (mvL0_A, ref0) in list 0 and (mvL0'_A, ref0') in list 1, is created and added into the third position (i.e. MergeIdx=2) of the Merge candidate list. Similarly, a scaled bi-predictive Merge candidate derived from a second motion candidate (MergeIdx=1) is inserted into the fourth position (i.e. MergeIdx=3) of the Merge candidate list. The second motion candidate is a list 0 uni-predictive motion candidate. The scaled bi-predictive Merge candidate has (mvL1'_A ref1') in list 0 and (mvL1_A, ref1) in list 1, pointing to two reference blocks in reference pictures L0R1 366 and L1R1 368.

Figure 4:
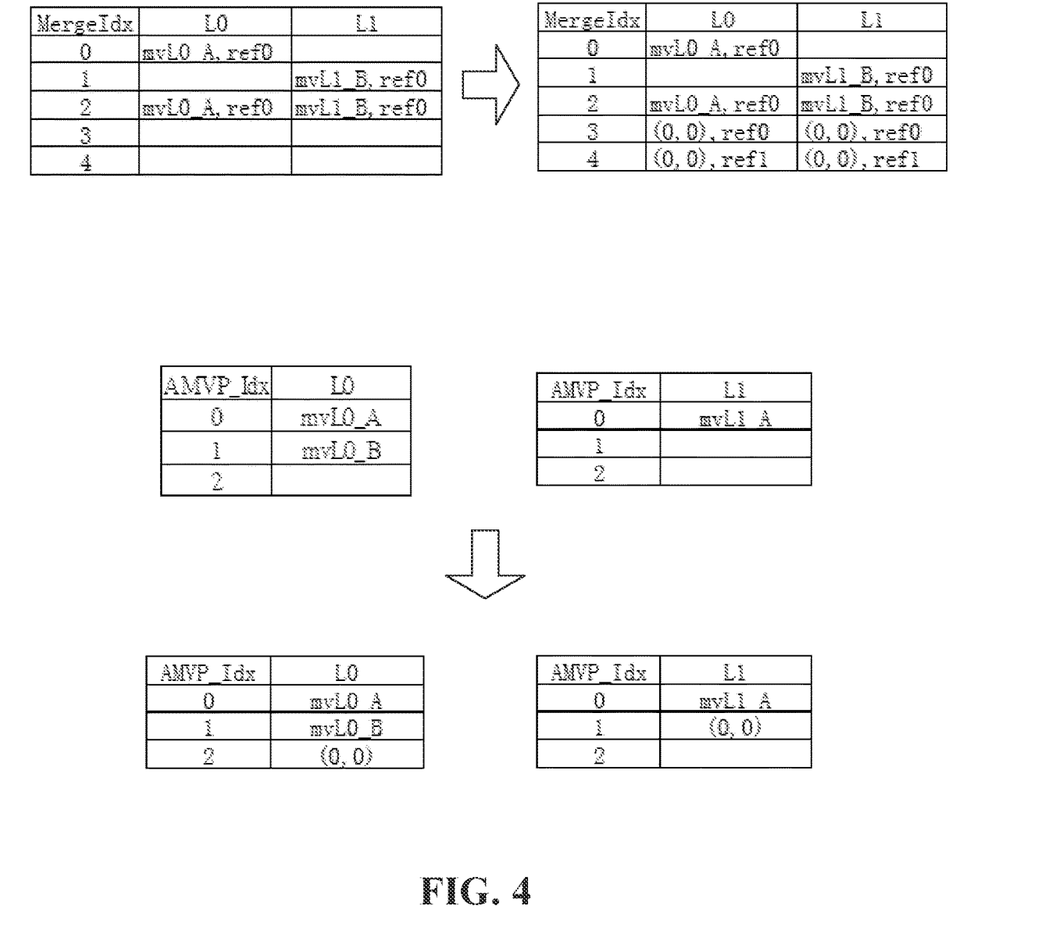
FIG. 4 illustrates examples of deriving zero vector Merge candidates and zero vector AMVP candidates for a Merge candidate list and AMVP candidate list.

The zero vector Merge/AMVP candidate is created by combining zero vectors and the reference indices are referred. FIG. 4 shows an example of inserting zero vector Merge candidates in a Merge candidate list or in an AMVP candidate list when there are still one or more empty positions and if the zero vector candidates are not duplicated.

Figure 5:
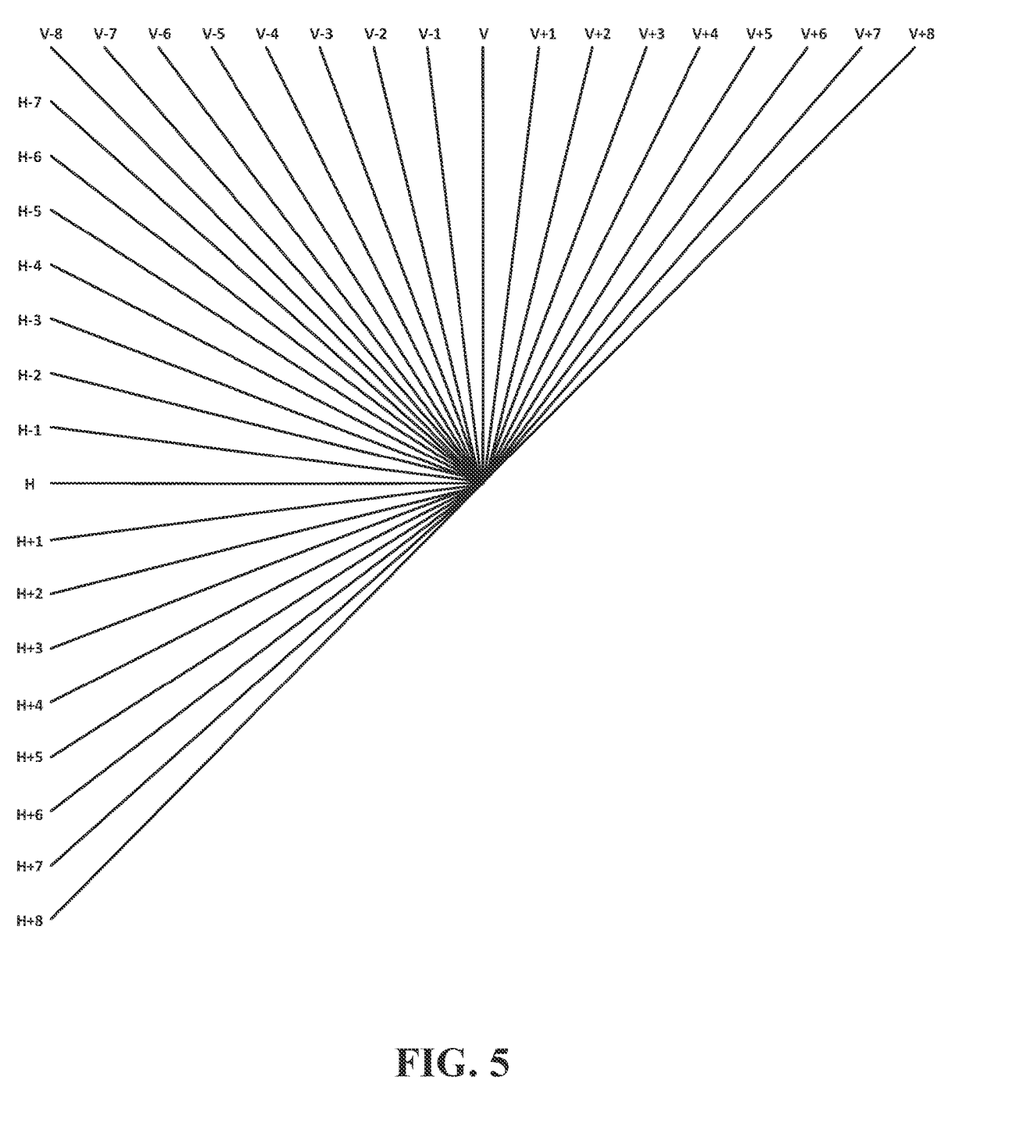
FIG. 5 illustrates 33 angular intra prediction modes supported in the HEVC standard.

Intra Picture Prediction Modes For a current block coded in Intra picture prediction mode, traditionally, the intra prediction method only exploits one reference tier adjacent to the current block and one of the intra prediction modes to generate predictors for the current block. The HEVC standard supports 35 intra prediction modes including 33 angular modes, DC mode and Planar mode. FIG. 5 illustrates the prediction directions for the 33 angular intra prediction modes of the HEVC standard, where H represents Horizontal direction mode and V represents Vertical direction mode. An intra prediction mode selected from the 35 intra prediction modes is signaled explicitly or inferred from previously decoded modes of above and left neighboring blocks of the current block. The intra prediction modes of the two neighboring blocks are included in a set of three Most Probable Modes (MPMs). A first MPM flag is signaled to indicate whether the selected mode is identical to one of the three MPMs, if so, another flag is sent to indicate which of the three MPMs is selected; if the first MPM flag is false, the selected intra prediction mode is explicitly signaled using a 5-bit fixed length codeword to choose one mode from the remaining 32 non-MPM modes.

The 33 angular modes shown in FIG. 5 can be expanded to a general case with more or less angular modes, where each of the angular modes can be represented by mode H+k or mode V+k, where H represents the direction of Horizontal mode, V represents the direction of Vertical mode, and k=0, +−1, +−2, . . . +−K. For example, if 65 angular modes are used for intra prediction, k is ranged from −16 to 16, and mode H-16 and mode V-16 are the same mode as this mode refers to the prediction direction from an upper-left corner to the center of the current block.

SUMMARY

Methods of video data processing in a video encoding or decoding system utilizing a final predictor for predicting a current block in a current video picture, comprise receiving input data associated with the current block, generating a motion compensated predictor for the current block according to one candidate selected from a first candidate list, generating a second predictor for the current block, generating a final predictor by combining the motion compensated predictor and the second predictor, and encoding or decoding the current block according to the final predictor. The first candidate list includes an average candidate derived from averaging motion information of multiple existing candidates in the first candidate list.

In some embodiments, the current block can be coded with Merge, Skip, or Intra mode.

In an embodiment of constructing the first candidate list, Merge candidates of sub-PU modes are excluded from the first candidate list. In another embodiment of constructing the first candidate list, similarity of candidates in the first candidate list is checked in order to remove one or more candidates with similar motion information from the first candidate list.

In some embodiments, a size of the first candidate list is equal to a fixed candidate list size, and the method further comprises including one or more additional candidates to fill one or more empty positions of the first candidate list when a number of candidates in the first candidate list is less than the fixed candidate list. The one or more additional candidates are selected from one or a combination of combined Merge candidates, scaled Merge candidates, and zero vector Merge candidates. In an embodiment, the average candidate is an additional candidate and is included to fill an empty position in the first candidate list when the size of the first candidate list is less than the fixed candidate list size. In another embodiment, the fixed candidate list size is defined as a fixed value, or signaled at CU, CTU, slice, tile, tile group, picture, Sequence Parameter Set (SPS), or Picture Parameter Set (PPS) level.

In some embodiments, a Motion Vector (MV) of the average candidate is derived by averaging MVs of two existing candidates with corresponding weightings. The weighting is fixed or changed with a property of the corresponding MVs, or the weightings are signaled at a Coding Unit (CU), Coding Tree Unit (CTU), slice, tile, tile group, picture, Sequence Parameter Set (SPS), or Picture Parameter Set (PPS) level. In another embodiment, the weightings are determined depending on a block height and a block width of the current block, and a larger weighting is applied to the MV corresponding to a left neighboring block when the block height is larger than the block width. In one embodiment, the average candidate is derived from motion information of the existing candidates with a same reference picture.

The first predictor for the current block is generated by motion compensation from Merge or Skip mode according to some embodiments; and the first predictor is generated according to one candidate selected from a first candidate list. In one embodiment, the first candidate list includes an average candidate derived from averaging motion information of multiple existing candidates in the first candidate list. A MV of the average candidate is derived from averaging MVs of two existing candidates in the first candidate list with corresponding weightings. In an exemplary embodiment, the motion compensated predictor for the current block is generated by uni-prediction or bi-prediction according to the candidate selected from the first candidate list.

The second predictor for the current block is generated by motion compensation from Merge or Skip mode according to some embodiments; and the second predictor is generated according to one candidate selected from the first candidate list or a second candidate list. In one embodiment, the second candidate list includes an average candidate derived from averaging motion information of multiple existing candidates in the second candidate list. A MV of the average candidate in the second list is derived from averaging MVs of two existing candidates in the first or second candidate list with corresponding weightings. For example, a first predictor is selected from a first candidate list and a second predictor is selected from the same first candidate list. In this example, a shared candidate list is used for both the first and second predictors. In another example, a first predictor is selected from a first candidate list while a second predictor is selected from a second candidate list. The first candidate list includes an average candidate derived from two existing candidates in the first candidate list, and the second candidate list includes an average candidate derived from two existing candidates in the first candidate list. In an exemplary embodiment, the motion compensated predictor for the current block is generated by uni-prediction according to the candidate selected from the first candidate list, and the second predictor for the current block is also generated by uni-prediction according to one candidate selected from the first candidate list or a second candidate list. In another embodiment, the motion compensated predictor for the current block is generated by uni-prediction or bi-prediction according to the candidate selected from the first candidate list.

The second predictor for the current block is generated by an intra prediction mode according to some other embodiments, and the intra prediction mode is decided according to various embodiments. In one embodiment, the intra prediction mode is selected from a list and a number of intra prediction modes in the list may be determined depending on a block width, block height, or block size of the current block. In another embodiment, the intra prediction mode is selected from a list and intra prediction modes in the list are determined according to a block width and a block height of the current block. In another embodiment, the intra prediction mode is selected from any subset of {Planar, DC, Horizontal, Vertical}, such as {Planar, DC} or {Planar}.

Aspects of the disclosure further provide an apparatus for video data processing in a video encoding or decoding system utilizing a final predictor for predicting a current block in a current video picture. The apparatus comprises one or more electronic circuits configured for receiving input data of the current block, generating a motion compensated predictor for the current block according to one candidate selected from a first candidate list, generating a second predictor for the current block, generating a final predictor by combining the motion compensated predictor and the second predictor, and encoding or decoding the current block according to the final predictor. The first candidate list includes an average candidate derived from averaging motion information of multiple existing candidates in the first candidate list.

Aspects of the disclosure further provide a non-transitory computer readable medium storing program instructions for causing a processing circuit of an apparatus to perform a video processing method to encode or decode a current block. A final predictor is generated by combing multiple predictors including a motion compensated predictor derived from a first candidate list. The first candidate list includes an average candidate derived by averaging two or more MVs. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF PREFERRED IMPLEMENTATIONS

In the following detailed description, numerous specific details of components and methods are set forth by way of examples in order to provide a thorough understanding of the present invention. Selected embodiments of the present invention generally described and illustrated in the figures herein, may be arranged, designed, and extended in a wide variety of different configurations. Any variations, derivations, or extensions based on the teachings described herein are within the protective scope of the present invention. In some instances, well-known methods or components pertaining to one or more embodiments disclosed herein may be described without giving details.

Embodiments of the present invention provide new methods of generating a final predictor by combining multiple predictors for encoding or decoding a current block. One of the predictors is generated by inter prediction and another predictor is generated by intra prediction or inter prediction. The current block is a PU, a leaf CU, or a sub-block in various different embodiments. The new methods combining multiple predictors are referred to as Multi-Hypothesis (MH) mode in the disclosure. The MH mode improves prediction accuracy of traditional inter prediction by combining multiple predictors derived from different hypothesis. The MH mode is an improved method applied in Skip, Merge, or Intra mode. The current block predicted by combining multiple predictors is coded with Merge, Skip, or Intra mode according to various embodiments of the present invention.

To encode or decode a current block using the MH mode according to some preferred embodiments of the present invention, a first predictor for the MH mode is derived by Merge or Skip mode. One Merge index is used to select one motion candidate from a Merge candidate list for generating a first predictor. In one embodiment, the first predictor is a motion compensated predictor generated by uni-prediction or bi-prediction according to the selected motion candidate. In another embodiment, the first predictor can only be generated by uni-prediction in order to reduce the computational complexity. The generated motion compensated predictor is referred to as the first hypothesis of the MH mode. A second predictor is generated by motion compensation from Merge or Skip mode, or is generated by an intra prediction mode from intra prediction. The second predictor referred to as the second hypothesis of the MH mode.

When multi-hypothesis mode is supported, one or more multi-hypothesis candidates are available for Skip, Merge, or Intra mode. The multi-hypothesis mode is called MH mode for Intra when the second hypothesis is generated by an intra prediction mode, and the multi-hypothesis mode is called MH mode for Merge when the second hypothesis is generated by motion compensation from Merge or Skip mode. The following embodiments assume a final predictor is generated using two hypotheses; however, these embodiments may be extended to multi-hypothesis mode with more than two hypotheses.

A first predictor of the MH mode is derived from a motion candidate selected from a first candidate list, Candidate List I. The composition of Candidate List I is the same as for the normal Merge mode according to one embodiment, or according to some other embodiments, the composition of Candidate List I is different from the normal Merge mode due to one or more settings related to available types of Merge candidates or similarity of the Merge candidates. An example of the setting related to the available types of Merge candidates excludes Merge candidates of sub-PU modes when constructing the first candidate list, so any Merge candidate of a sub-PU mode is exclusive of Candidate List I. An example of the setting related to the similarity of Merge candidates excludes Merge candidates with similar motion information when constructing the first candidate list for MH mode. In the cases of MH mode for Merge, a second predictor may be derived from a motion candidate selected from a second candidate list, and the composition of the second candidate list may also follow the same setting(s) to exclude one or more Merge candidates. In one embodiment, a first predictor for a current block is generated by uni-prediction using a motion candidate selected from a first candidate list, and a second predictor for the current block is generated by uni-prediction using a motion candidate selected from a second candidate list. A final predictor for the current block is generated by combining the first predictor and the second predictor.

Some mechanisms are applied to fill the first candidate list with new Merge candidates in a predefined rule when a number of available candidates in the first candidate list is less than a fixed candidate list size. The fixed candidate list size is predefined as a fixed value, or signaled at CU, CTU, slice, tile, tile group, picture, Sequence Parameter Set (SPS), or Picture Parameter Set (PPS) level in order to prevent parsing error propagation. In some embodiments, the predefined rule for adding one or more new Merge candidates is the same as the rule used in the HEVC standard. For example, one or a combination of the combined Merge candidates, scaled Merge candidates, or zero vector Merge candidates are added to the first candidate list when there is at least one empty position in the first candidate list. In some other embodiments, the predefined rule generates one or more average candidates to be included in the first candidate list by averaging motion information of existing Merge candidates in the first candidate list. A Motion Vector (MV) of the average candidate $MV_{avg}$ within a pre-defined list (for example, list 0 and/or list 1) may be calculated according to the following equation:

$$MV_{avg} = W_i * MV_i + W_j * MV_j,$$

where $MV_i$ and $MV_j$ are the MVs within the pre-defined list for the existing candidates in the first candidate list to form the average candidate with corresponding weightings $W_i$ and $W_j$. In one embodiment, an average candidate may be used to generate one or multiple hypotheses, that is one or both of the first predictor and second predictor are derived by a motion candidate selected from a candidate list including one or more average candidates.

The weightings $W_i$ and $W_j$ for generating the average candidate are fixed or changed with the property of the corresponding MV, or the weightings are signaled at CU, CTU, slice, tile, tile group, picture, Sequence Parameter Set (SPS), or Picture Parameter Set (PPS) level. For example, the two weightings $W_i$ and $W_j$ are equal. In another example, if a block height of a current block is larger than a block width, a MV derived from a left neighboring block of the current block has larger weighting than another MV. Similarly, a MV derived from an above neighboring block of the current block has larger weighting if the block width is larger than the block height. In some embodiments, some settings are applied to generate one or more average candidate to be included in a candidate list. For example, only the candidates with the same reference picture are allowed to be averaged to generate an average candidate. The one or more new candidates for MH mode for Merge may be inserted following the candidates from the normal Merge mode or in front of the candidates from the normal Merge mode. In one embodiment, an average candidate is inserted in a predefined position in the first candidate list. The one or more new candidates may be checked with one or more existing motion candidates in the candidate list by a pruning process to eliminate redundancy in the candidate list.

For MH mode for Intra, a final predictor is derived by combining a motion compensated predictor and an intra predictor. The motion compensated predictor is generated by motion compensation according to a motion candidate and the intra predictor is generated by intra prediction according to an intra prediction mode. In one embodiment, one motion candidate matches with one or more intra prediction modes at a video encoder, and the video encoder determines one motion candidate and one of the matched intra prediction modes for predicting a current block through an encoding mode decision. In one embodiment, syntax elements indicating the selected motion candidate and the selected intra prediction mode for the current block are signaled to a video decoder. In another embodiment, a syntax element indicating the selected motion candidate for the current block is signaled to a video decoder and the intra prediction mode is selected without any syntax element. The video decoder parses and decodes at least one of the selected motion candidate and intra prediction mode for the current block to reconstruct a final predictor for the current block.

Some embodiments of deriving an intra predictor for a current block select an intra prediction mode from a second candidate list, Candidate List II. A number of intra prediction modes in Candidate List II, denoted as N, may be varied with implicit criteria according to various embodiments. Some examples of the implicit criteria determine the number of intra prediction modes in Candidate List II depending on a block width, block height, or block size of the current block. In one embodiment, the number of intra prediction modes in the second candidate list is reduced for blocks with areas smaller than a particular threshold. The intra prediction modes in the second candidate list for those small blocks are a subset of the original intra prediction modes for larger blocks. For example, an original Candidate List II for blocks larger than or equal to a threshold includes four intra prediction modes, {Planar, DC, Horizontal, Vertical}, and a reduced Candidate List II for blocks smaller than the threshold is a subset of the above four intra prediction modes in the original Candidate List II, such as {Planar, DC} or {Planar}. In another embodiment, an intra prediction mode for a current block is selected from a second candidate list and intra prediction modes in the second candidate list are determined according to a block width and a block height of the current block. In some embodiments, the second candidate list can be any subset of {Planar, DC, Horizontal, Vertical}, such as {Planar, DC} or {Planar}. In another embodiment, a number of intra prediction modes in the second candidate list is varied when a long side, denoted as L, and a short side, denoted as S, of a current block satisfied the following condition:

$$L > T*S,$$

where T is a positive number such as 1, 2, or 4. For those blocks satisfying the above condition, if the long side is the block width, a number of vertical-oriented modes is greater than a number of horizontal-oriented modes, else a number of horizontal-oriented modes is greater than a number of vertical-oriented modes. For example, Horizontal mode is removed from Candidate List II used for generating a second predictor for a current block if the above condition is satisfied and the long side is the block width. Similarly, Vertical mode is removed from Candidate List II used for generating the second predictor if the above condition is satisfied and the long side is the block height.

The above described methods for generating a predictor or a hypothesis of the multi-hypothesis mode may be applied to MH mode for Merge or MH mode for Intra. For example, a first predictor is generated from a first candidate list including one or more average candidates when only the first predictor is derived from Merge or Skip mode. In another example, both first and second predictors are generated from candidate lists including one or more average candidates when both the first and second predictors are derived from Merge or Skip mode.

A final predictor for predicting a current block is generated by combining first and second predictors through weighted averaging. When both the first and second predictors are generated by motion compensation according to motion candidates derived from spatially neighboring blocks, the weightings for the first and second predictors can be given according to pixel distances between the current block and those spatially neighboring blocks. For example, higher weightings are assigned to shorter pixel distances while lower weightings are assigned to longer distances. The first predictor is derived from a candidate selected from a first candidate list by Motion Vector Competition (MVC) such as a Rate Distortion Optimization (RDO) decision at a video encoder side or by an index transmitted in a video bitstream at a video decoder side. The second predictor is derived from a candidate selected from the first or a second candidate list by MVC at the video encoder side or by an index transmitted in the video bitstream at the video decoder side if the second predictor is a motion compensated predictor. In other words, when both the first and second predictors are motion compensated predictors, the first and second predictors are derived using candidates selected from the same candidate list according to one embodiment. Each of the first and second predictors is derived using a candidate selected from a different candidate list according to another embodiment. An index indicating the selected candidate for deriving the first predictor, an index indicating the selected candidate for deriving the second predictor, along with prediction residual of the current block are signaled for the current block coded in Merge mode, and only the indices indicating the selected candidates for deriving the first and second predictors are signaled for the current block coded in Skip mode. In some other embodiments, the second predictor is derived from an intra prediction mode decided at the video encoder side or determined at the video decoder side, an index indicating the selected candidate for deriving the first predictor along with prediction residual of the current block are signaled for the current block coded in Merge mode, and/or only the index indicating the selected candidate is signaled for the current block coded in Skip mode.

Figure 6:
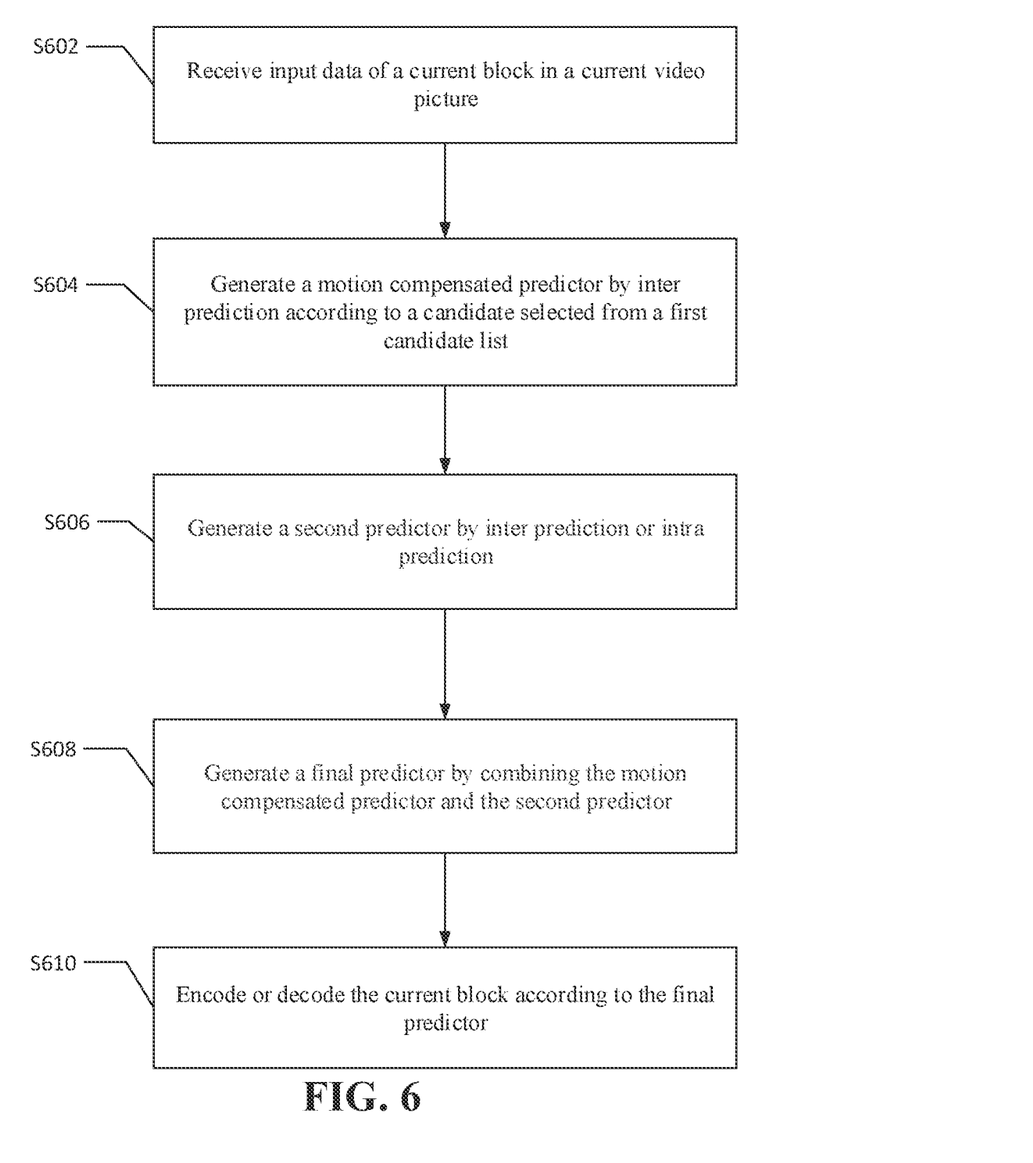
FIG. 6 is a flowchart illustrating an embodiment of the video coding system for processing a current block by generating a final predictor from a motion compensated predictor and a second predictor.

FIG. 6 conceptually illustrates an exemplary flowchart of a video encoding or decoding system for processing a current block predicted by multiple predictors. A current MV associated with the current block is coded by a final predictor derived from multiple predictors. The exemplary embodiment shown in FIG. 6 derives the final predictor from two predictors. The video encoding or decoding system receives input data of the current block in a current video picture in Step S602, and generates a motion compensated predictor for the current block by inter prediction according to a candidate selected from a first candidate list in Step S604. The first candidate list includes an average candidate derived from averaging motion information of multiple existing candidates in the first candidate list. In one embodiment, the average candidate is calculated and added to the first candidate list only when a number of candidates in the first candidate list is less than a fixed candidate list size. A MV of the average candidate is derived from MVs of two existing candidates with corresponding weightings, and the weightings may be fixed or changed with a property of the corresponding MVs according to some embodiments. In another embodiment, the weightings are signaled in a CU, CTU, slice, tile, tile group, picture, SPS, or PPS level. A second predictor for the current block is generated in step S606, and the second predictor is a motion compensated predictor generated by inter prediction according to one embodiment or an intra predictor generated by intra prediction according to another embodiment. The processing order of steps S604 and S606 may be switched, or the two steps may be performed at the same time. The video encoding or decoding system generates a final predictor by combining the motion compensated predictor and the second predictor in step S608, and encodes or decodes the current block according to the final predictor in step S610.

Figure 7:
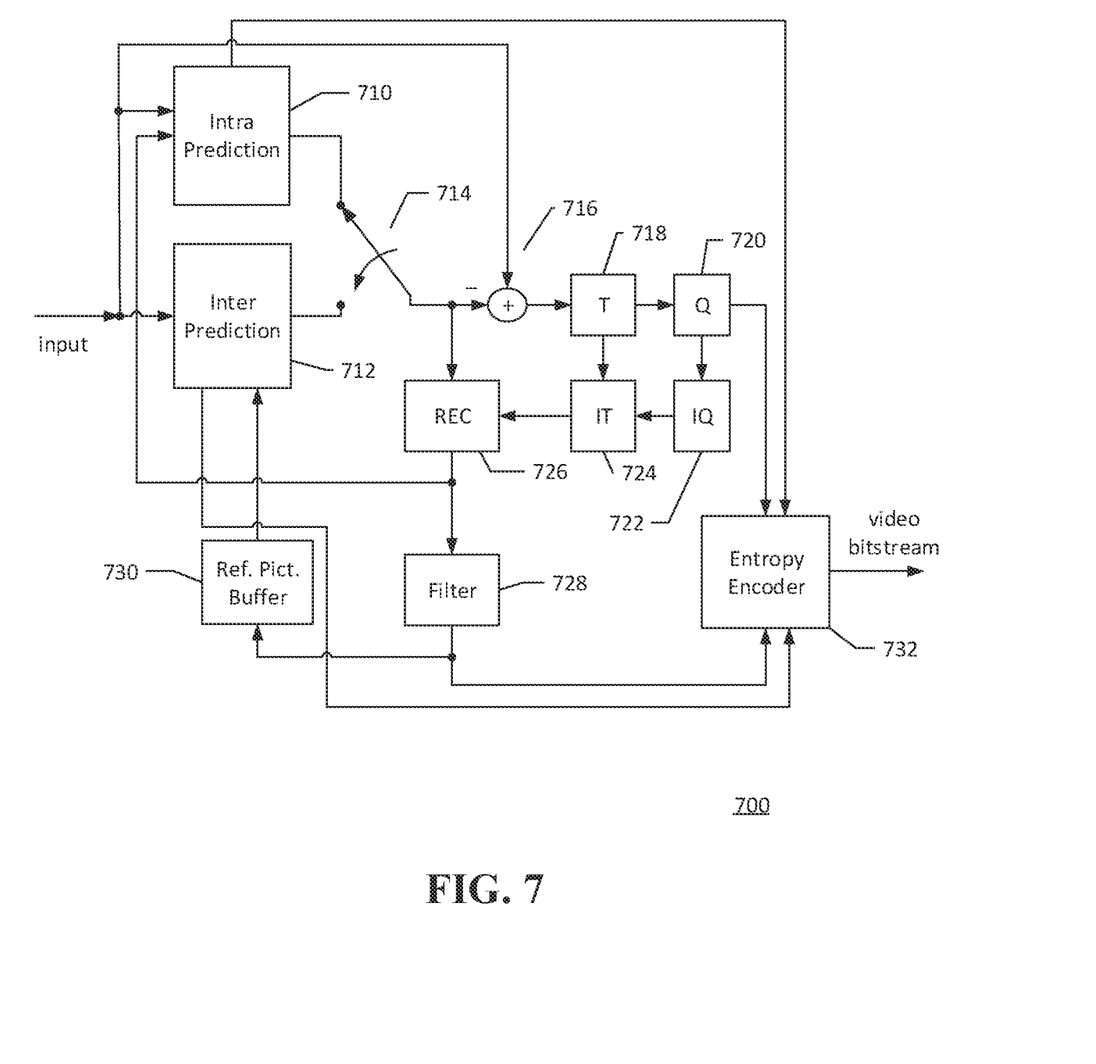
FIG. 7 illustrates an exemplary system block diagram for a video encoding system incorporating the video processing method according to embodiments of the present invention.

The foregoing proposed video processing methods for generating a final predictor based on multiple predictors can be implemented in video encoders or decoders. For example, a proposed video processing method is implemented in one or a combination of an inter prediction module, intra prediction module, motion compensation module, and Merge candidate derivation module of an encoder or decoder. Alternatively, any of the proposed methods is implemented as a circuit coupled to one or a combination of the inter prediction module, intra prediction module, motion compensation module, Merge candidate derivation module of the encoder or decoder, so as to provide the information needed by the module. FIG. 7 illustrates an exemplary system block diagram of a Video Encoder 700 capable of implementing various embodiments of the present invention. Intra Prediction module 710 provides intra predictors based on reconstructed video data of a current picture. Inter Prediction module 712 performs motion estimation (ME) and motion compensation (MC) to provide inter predictors based on video data from one or more reference pictures. To encode a current block in inter picture prediction according to some embodiments of the present invention, a final predictor is generated based on multiple predictors, and one of the predictors is derived from a candidate selected from a first candidate list. The first candidate list includes an average candidate derived by averaging motion information of multiple existing candidates in the first candidate list. The Inter Prediction module 712 determines a candidate from the first candidate list to derive a motion compensated predictor for the current block. In some embodiments, the Inter Prediction module 712 also derives a second predictor by motion compensation, and in some other embodiments, the Intra Prediction module 710 derives a second predictor by intra prediction. The Inter Prediction module 712 generates the final predictor for predicting the current block by combining the motion compensated predictor and the second predictor. The Inter Prediction module 712 supplies the final predictor for the current block to Adder 716 to form prediction errors, which are also called prediction residual. The prediction residual is set to zero if the current block is coded in Skip mode. When the current block is not coded in Skip mode, the prediction residual of the current block is further processed by Transformation module (T) 718 followed by Quantization module (Q) 720. The transformed and quantized residual signal is then encoded by Entropy Encoder 732 to form a video bitstream. The video bitstream is then packed with side information. The transformed and quantized residual signal of the current block is processed by Inverse Quantization module (IQ) 722 and Inverse Transformation module (IT) 724 to recover the prediction residual. As shown in FIG. 7, the prediction residual is recovered by adding back to the selected predictor at Reconstruction module (REC) 726 to produce reconstructed video data. The reconstructed video data may be stored in Reference Picture Buffer (Ref. Pict. Buffer) 730 and used for prediction of other pictures. The reconstructed video data recovered from Reconstruction module 726 may be subject to various impairments due to encoding processing; consequently, In-loop Processing Filter 728 is applied to the reconstructed video data before storing in the Reference Picture Buffer 730 to further enhance picture quality.

Figure 8:
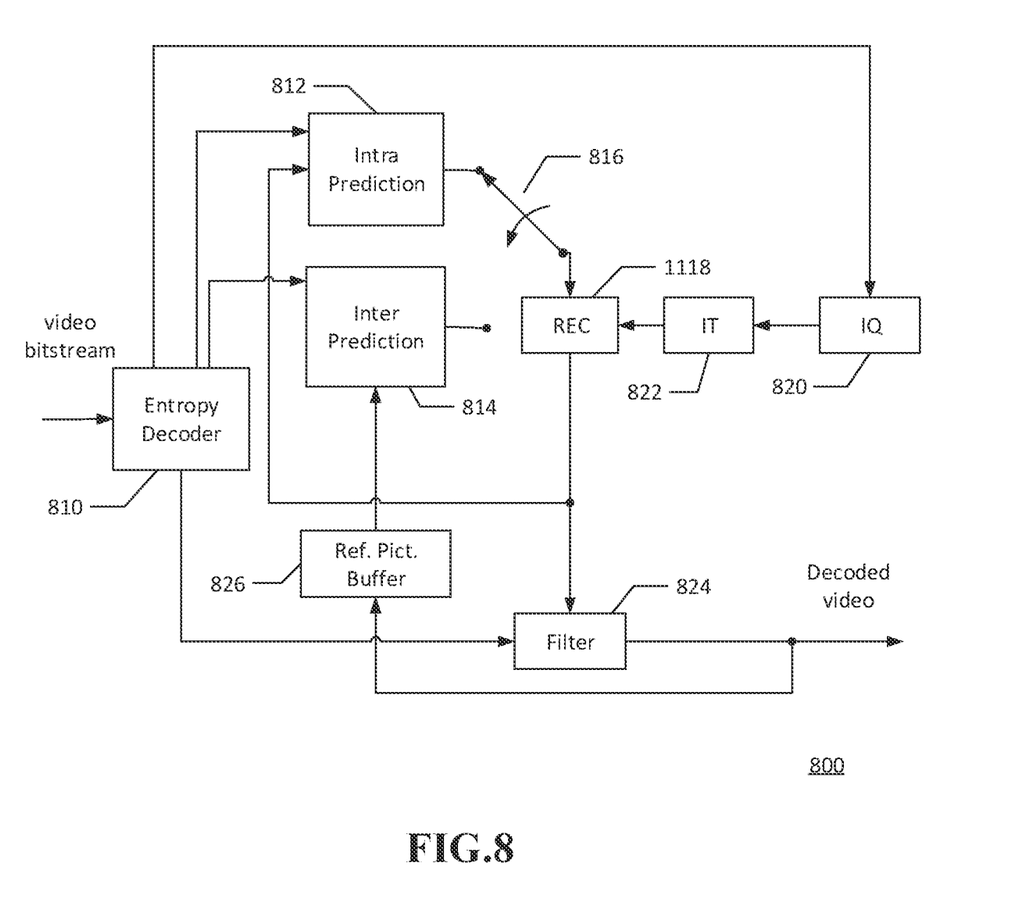
FIG. 8 illustrates an exemplary system block diagram for a video decoding system incorporating the video processing method according to embodiments of the present invention.

A corresponding Video Decoder 800 for decoding the video bitstream generated from the Video Encoder 700 of FIG. 7 is shown in FIG. 8. The video bitstream is the input to Video Decoder 800 and is decoded by Entropy Decoder 810 to parse and recover the transformed and quantized residual signal and other system information. The decoding process of Decoder 800 is similar to the reconstruction loop at Encoder 700, except Decoder 800 only requires motion compensation prediction in Inter Prediction module 814. Each block is decoded by either Intra Prediction module 812 or Inter Prediction module 814. Switch 816 selects an intra predictor from Intra Prediction module 812 or an inter predictor from Inter Prediction module 814 according to decoded mode information. When a current block is predicted by a final predictor combined using multiple predictors, Inter Prediction module 814 generates a first predictor using a candidate selected from a first candidate list. The first candidate list includes an average candidate derived by averaging motion information of multiple existing motion candidates of the first candidate list. A second predictor is an intra predictor generated by Intra Prediction module 812 or another motion compensated predictor generated by Inter Prediction module 814. Inter Prediction module 814 derives a final predictor for the current block based on the first and second predictors. The transformed and quantized residual signal associated with a current block is recovered by Inverse Quantization module (IQ) 820 and Inverse Transformation module (IT) 822. The recovered residual signal is reconstructed by adding back the final predictor in REC module 818 to produce reconstructed video. The reconstructed video is further processed by In-loop Processing Filter (Filter) 824 to generate final decoded video. If the currently decoded picture is a reference picture for later pictures in decoding order, the reconstructed video of the currently decoded picture is also stored in Reference Picture Buffer 826.

Various components of Video Encoder 700 and Video Decoder 800 in FIG. 7 and FIG. 8 may be implemented by hardware components, one or more processors configured to execute program instructions stored in a memory, or a combination of hardware and processor. For example, a processor executes program instructions to control receiving of input data associated with a current block in a current video picture. The processor is equipped with a single or multiple processing cores. In some examples, the processor executes program instructions to perform functions in some components in Encoder 700 and Decoder 800, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 7 and 8, Encoder 700 and Decoder 800 may be implemented in the same electronic device, so various functional components of Encoder 700 and Decoder 800 may be shared or reused if implemented in the same electronic device.

Embodiments of the video processing method for encoding or decoding may be implemented in a circuit integrated into a video compression chip or program codes integrated into video compression software to perform the processing described above. For examples, generating a final predictor for the current block may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video encoding or decoding system, comprising:

receiving input data associated with a current block in a current video picture;

generating a motion compensated predictor for the current block according to one candidate selected from a first candidate list, and wherein the one candidate is selected based on signaling at the video encoding system, or parsing at the video decoding system, a syntax element indicating the one candidate for the current block, wherein the first candidate list includes an average candidate derived from averaging motion information of a plurality of existing candidates in the first candidate list, wherein the average candidate is included to fill an empty position in the first candidate list when a number of candidates in the first candidate list is less than a fixed candidate list size, wherein the first candidate list contains more than one merging candidates without subblock merging candidates;

determining whether to apply multi-hypothesis mode for intra to the current block based on whether or not the current block is coded in skip mode, wherein the multi-hypothesis mode for intra is allowed for the current block only when the current block is not coded with skip mode;

in response to applying the multi-hypothesis for intra to the current block, generating a second predictor for the current block, wherein the second predictor is generated by an intra prediction mode, and wherein the intra prediction mode is selected without signaling or parsing any syntax element and comprises a planar mode;

generating a final predictor for the current block by combining the motion compensated predictor and the second predictor; and encoding or decoding the current block according to the final predictor.

2. The method of claim 1, wherein the first candidate list excludes Merge candidates of sub-PU modes.

3. The method of claim 1, further comprising checking similarity of candidates in the first candidate list and removing one or more candidates with similar motion information from the first candidate list.

4. The method of claim 1, wherein the first candidate list includes one or more additional candidates to fill one or more empty positions when a number of candidates in the first candidate list is less than a fixed candidate list size, and the one or more additional candidates are selected from one or a combination of combined Merge candidates, scaled Merge candidates, and zero vector Merge candidates.

5. The method of claim 1, wherein a Motion Vector (MV) of the average candidate MVavg is derived from MVs of two existing candidates MVi and MVj with corresponding weightings Wi and Wj.

6. The method of claim 5, wherein the weightings are fixed or changed with a property of the corresponding MVs.

7. The method of claim 5, wherein the weightings are signaled at a Coding Unit (CU), Coding Tree Unit (CTU), slice, tile, tile group, picture, Sequence Parameter Set (SPS), or Picture Parameter Set (PPS) level.

8. The method of claim 5, wherein the weightings are determined depending on a block height and a block width of the current block, and a larger weighting is applied to the MV corresponding to a left neighboring block when the block height is larger than the block width.

9. The method of claim 1, wherein the average candidate is derived from averaging motion information of the existing candidates with a same reference picture.

10. The method of claim 1, wherein the motion compensated predictor for the current block is generated by uni-prediction or bi-prediction according to the candidate selected from the first candidate list.

11. The method of claim 1, wherein the intra prediction mode is selected from a candidate list, and a number of intra prediction modes in the candidate list is determined depending on a block width, block height, or block size of the current block.

12. The method of claim 1, wherein the intra prediction mode is selected from a candidate list and intra prediction modes in the candidate list are determined according to a block width and a block height of the current block.

13. An apparatus of processing video data in a video encoding or decoding system, the apparatus comprising one or more electronic circuits configured for:

receiving input data associated with a current block in a current video picture;

generating a motion compensated predictor for the current block according to one candidate selected from a first candidate list, and wherein the one candidate is selected based on signaling at the video encoding system, or parsing at the video decoding system, a syntax element indicating the one candidate for the current block, wherein the first candidate list includes an average candidate derived from averaging motion information of a plurality of existing candidates in the first candidate list, wherein the average candidate is included to fill an empty position in the first candidate list when a number of candidates in the first candidate list is less than a fixed candidate list size, wherein the first candidate list contains more than one merging candidates without subblock merging candidates;

determining whether to apply multi-hypothesis mode for intra to the current block based on whether or not the current block is coded in skip mode, wherein the multi-hypothesis mode for intra is allowed for the current block only when the current block is not coded with skip mode;

in response to applying the multi-hypothesis for intra to the current block, generating a second predictor for the current block, wherein the second predictor is generated by an intra prediction mode, and wherein the intra prediction mode is selected without signaling or parsing any syntax element and comprises a planar mode;

generating a final predictor for the current block by combining the motion compensated predictor and the second predictor; and encoding or decoding the current block according to the final predictor.

14. A non-transitory computer readable medium storing program instruction causing a processing circuit of an apparatus to perform video processing method, and the method comprising:

receiving input data associated with a current block in a current video picture;

generating a motion compensated predictor for the current block according to one candidate selected from a first candidate list, and wherein the one candidate is selected based on signaling at the video encoding system, or parsing at the video decoding system, a syntax element indicating the one candidate for the current block, wherein the first candidate list includes an average candidate derived from averaging motion information of a plurality of existing candidates in the first candidate list, wherein the average candidate is included to fill an empty position in the first candidate list when a number of candidates in the first candidate list is less than a fixed candidate list size, wherein the first candidate list contains more than one merging candidates without subblock merging candidates;

determining whether to apply multi-hypothesis mode for intra to the current block based on whether or not the current block is coded in skip mode, wherein the multi-hypothesis mode for intra is allowed for the current block only when the current block is not coded with skip mode;

in response to applying the multi-hypothesis for intra to the current block, generating a second predictor for the current block, wherein the second predictor is generated by an intra prediction mode, and wherein the intra prediction mode is selected without signaling or parsing any syntax element and comprises a planar mode;

generating a final predictor for the current block by combining the motion compensated predictor and the second predictor; and encoding or decoding the current block according to the final predictor.

* * * * *